United States Patent
Pursell et al.

[11] 3,957,567
[45] May 18, 1976

[54] SPLICING APPARATUS

[75] Inventors: Jarsel M. Pursell; George N. Willman, both of Dallas, Tex.

[73] Assignee: Mobil Oil Corporation, New York, N.Y.

[22] Filed: Dec. 6, 1974

[21] Appl. No.: 530,265

[52] U.S. Cl. ............................ 156/505; 156/159; 156/267; 156/304; 156/523; 156/530
[51] Int. Cl.² .................................... B31F 5/06
[58] Field of Search ......... 156/157, 159, 304, 225, 156/267, 502, 505, 509, 516, 523, 524, 578, 506, 518, 527, 530

[56] References Cited
UNITED STATES PATENTS

| | | | |
|---|---|---|---|
| 1,044,258 | 11/1912 | Schafer | 156/502 |
| 2,495,957 | 1/1950 | Corsaw | 156/509 |
| 3,773,598 | 11/1973 | Taeffner et al. | 156/505 |

*Primary Examiner*—William A. Powell
*Assistant Examiner*—Brian J. Leitten
*Attorney, Agent, or Firm*—C. A. Huggett; Drude Faulconer

[57] ABSTRACT

An apparatus for splicing together two large sheets of material, e.g., seismic sections, where one operator can carry out the splicing operation. The apparatus is comprised of a work surface onto which the material is positioned and held in place by vacuum and mechanical means. A carriage, mounted on guide means which extend across the work surface, has a knife which cuts the material along a desired line as the carriage moves in a first direction and adhesive dispensing means to apply tape to the material along said desired line as the carriage moves in the opposite direction.

10 Claims, 5 Drawing Figures

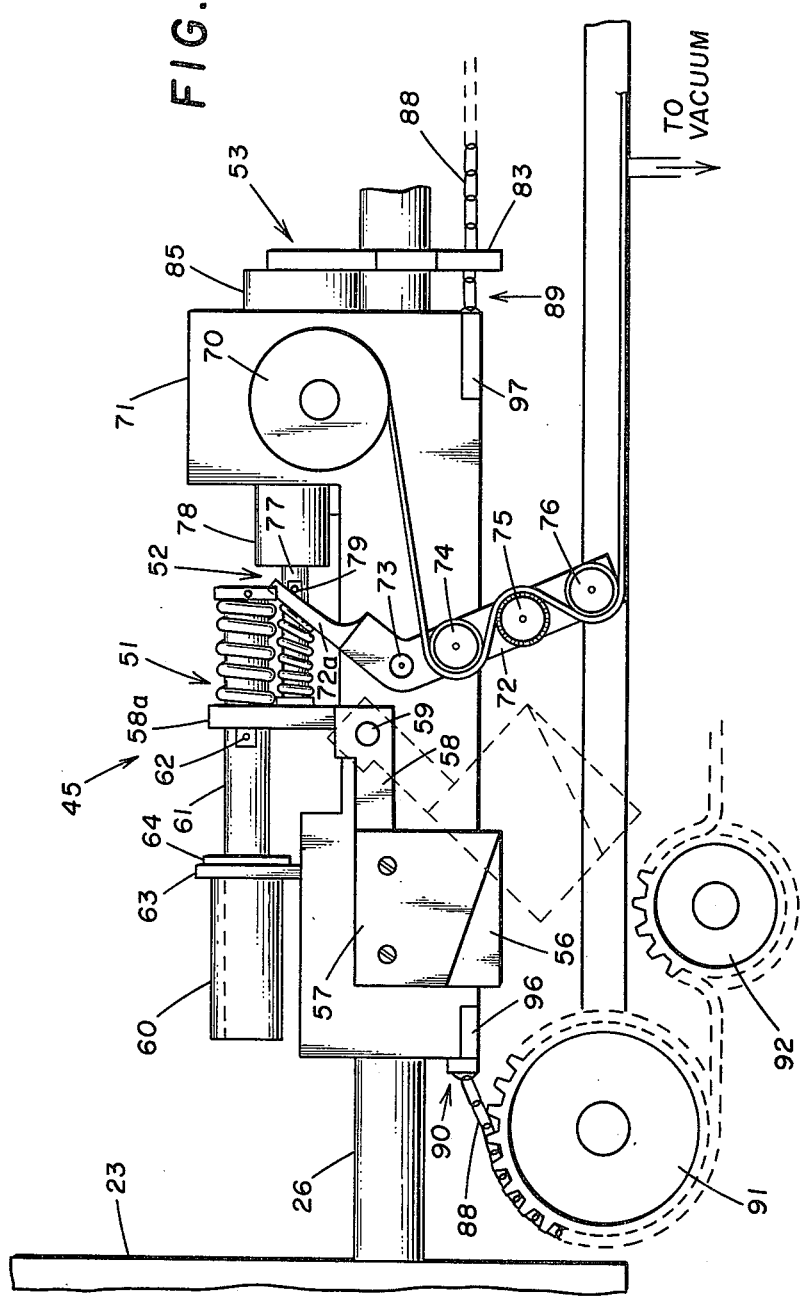
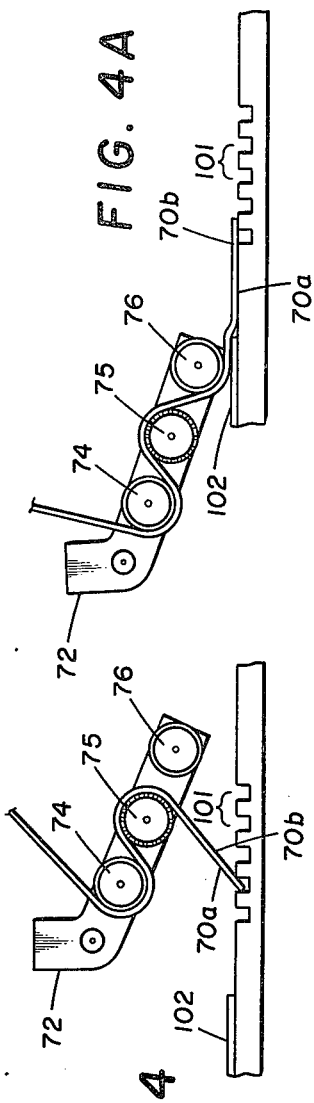
FIG. 3
FIG. 4
FIG. 4A

SPLICING APPARATUS

BACKGROUND OF THE INVENTION

This invention relates to an apparatus for splicing two sheets of material together in a desired relationship and more particularly relates to an apparatus which automatically trims and tapes two relatively large sheets of material together after the sheets have been properly positioned in the apparatus.

It becomes necessary at times to piece together individual sheets of material in a fixed relationship in order to compose a complete overview of a particular subject. One example of where this is routinely done is in the art of seismic interpretation where several large sheets of processed film must be connected together in exact relationship to provide the complete seismic picture required for certain analyses. These sheets of film are normally relatively large, e.g., 61 or 91.5 centimeters wide, and, as such, are difficult to accurately position, trim, and tape as is required to properly compose a complete seismic overview.

Previously, two sheets were manually overlaid in desired relationship and, with aid of a straight edge, were cut along a desired line with a razor blade or the like. The scrap was then removed and tape was manually applied to the cut edges of the sheets to complete the process. As can be readily seen, this operation is not only time consuming but is demanding on the operator in that he must maintain the abutting edges of the sheets in proper relationship until the tape has been applied. Small devices have long been available for splicing small articles, e.g., movie film, but this basic type of device is impractical for splicing larger sheets of material such as the above-described seismic sections.

SUMMARY OF THE INVENTION

The present invention provides an apparatus for splicing together two large sheets of material where one operator can carry out the procedure quickly and accurately. The apparatus is comprised of a table having a work surface which is preferably of a translucent or transparent material to provide a lighted surface on which the material to be spliced can be accurately positioned. A first sheet of material, e.g., seismic section, is laid onto the table and positioned as desired. A vacuum is applied to the underside of this section by means of a series of ducts within the table surface to anchor said first section in position. A second sheet or seismic section is overlaid the first section so that the matching portions of each section accurately align and the line between the two sections which is to be cut overlies a cutting groove provided in the work surface.

Holddown means having a plurality of spring biased gripping members is then moved into contact with the second section to apply pressure to said second section to hold it firmly against the first section.

A carriage, mounted on guide rails which extend longitudinally across the table, is then actuated to carry out the splicing operation. The carriage carries a material cutting knife, adhesive material (tape) dispensing means, and a tape knife. As the carriage moves along the guide rails in a first direction, the material cutting knife is lowered so that it passes through both sections and enters into the cutting groove on the table. Continued movement of the carriage in the first direction allows the material cutting knife to clearly sever the two sections along the desired line.

A limit switch stops the carriage when it has completed its travel in the first direction. The waste or cut-away portion of the top section is discarded and the carriage is moved back across the table along the guide rails in the opposite direction during which travel the adhesive material dispensing means is lowered to tape the sections together along the severed line. When the taping operation has been completed, the tape knife is lowered to cut the tape. The holddown means is then raised and the vacuum is released so that the spliced material may be removed.

BRIEF DESCRIPTION OF THE DRAWINGS

The actual construction, operation, and apparent advantages of the invention will be better understood by referring to the drawings in which like numerals identify like parts and in which:

FIG. 3 is a side view of the splicing carriage of FIG. 2;

FIG. 4 is a partial view of the adhesive material dispensing means when in an inoperable position; and FIG. 4A is a partial view of the adhesive material dispensing means when in an operable position.

DESCRIPTION OF THE PREFERRED EMBODIMENT

Figure 1:
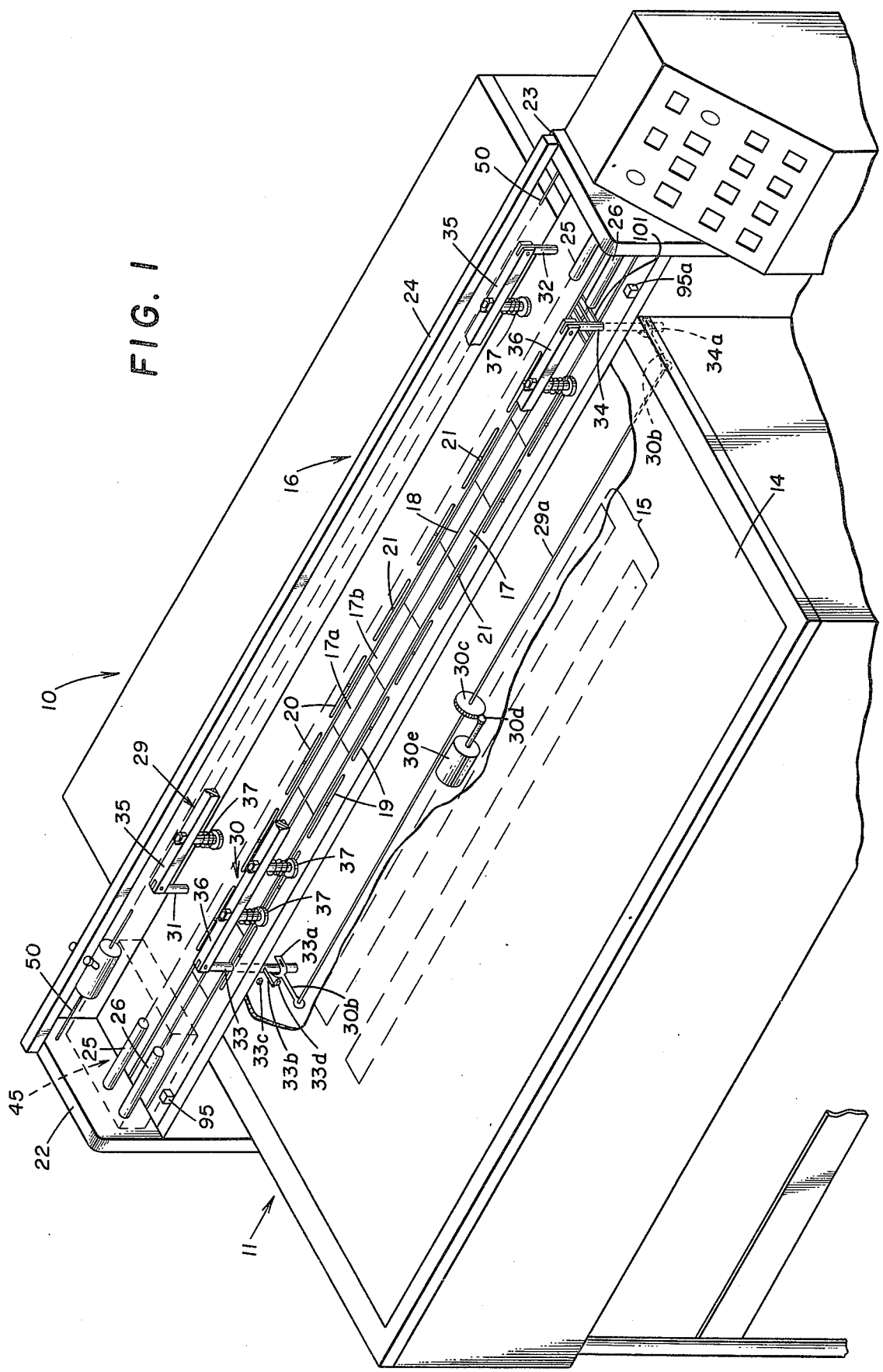
FIG. 1 is a perspective view, partly in section, of the work surface and splicing assembly of the present invention.

Referring more particularly to the drawings, FIG. 1 discloses apparatus 10 for splicing two sheets (not shown) of material together. For purposes of description, these sheets of material will be referred to as seismic sections which are normally large sheets of processed, photographic film, although is should be recognized that other materials can be spliced as well.

Apparatus 10 is comprised of working surface 11 which is preferably the top of a wide table, e.g., 127 centimeters or greater, supported on legs or the like. A portion 14 of surface 11 is comprised of a translucent material (this includes transparent material) under which lights 15, such as neon (fluorescent) tubes, are positioned.

Forming an integral part of table 11 and extending laterally across the width of same is splicing assembly 16. Positioned at either end of assembly 16 are supports 22 and 23, respectively. Guide bar 24 extends the entire length of assembly 16 and is attached between supports 22 and 23 as are guide rods 25, 26 (shown broken away in FIG. 1). Inset in assembly 16 and substantially flush with surface 11 is track 17 which is preferably formed of sections of translucent material under which powerful lights (not shown) are positioned for a purpose described later.

Preferably, the material forming sections of track 17 extending from support 22 to the end of section 17a is of different material than that which forms the sections beginning with section 17b and extending to support 23. The material, e.g., Delrin a registered U.S. trademark of E. I. DuPont de Nemours and Co., forming the sections through section 17a is to be "nonsticking" with respect to the adhesive material to be used, while the material, e.g., nylon, forming sections 17b to support 23 is to allow "controlled sticking" with respect to the adhesive material. The purpose of these materials will become evident from the description of operation set forth below. Extending longitudinally within track 17 is cutting groove 18 while rows of slots 19 and 20 extend longitudinally across assembly 16 on either side of track 17. Within each slot 19 and 20 is an opening 21, all of said openings being in communication with a means, e.g., vacuum pump (not shown) beneath work surface 11, for pulling a vacuum in slots 19, 20, as will be explained more fully below.

Also extending longitudinally across assembly 16 are holddown means 29 and 30 which are comprised of actuator rods 31, 32, and 33, 34, respectively, which in turn are connected by bars 35 and 36, respectively. Spaced at intervals throughout the lengths of bars 35, 36 are gripping members 37 (see FIGS. 1 and 2). Each member 37 is comprised of a shaft 38, slidably positioned through an opening in its respective bar and has a foot 39 on the lower end thereof and a retainer nut 40 on the other end. Spring 41 is positioned on shaft 38 between bar 36 (FIG. 2) and foot 39 to normally bias foot 39 downward with respect to bar 36.

Actuator rods 31, 32, and 33, 34 are slidably positioned through assembly 16 and are operably connected to a prime mover or movers which, when actuated, will cause rods 31, 32 and/or 33, 34 to move downward toward surface 11 to bring feet members 39 into contact with any material which may be beneath same. As illustrated in FIG. 1, one mechanism for actuating holddown means 30 in shaft 30a journaled below work surface 11, having slotted forks 30b on either end which in turn cooperate with pins 33a and 34b on actuator rods 33 and 34, respectively. Gear 30c is affixed on shaft 30a and mates with drive gear 30d on low rpm, reversible electrical motor 30e. When motor 30e is driven in one direction, gear 30c causes shaft 30a to rotate and through forks 30b will raise rods 33, 34 evenly to lift bar 36. When said motor is reversed, forks 30b will evenly lower rods 33, 34 to move bar 36 downward toward work surface 11. Contact 33b on rod 33 cooperates with limit switches 33c and 33d to stop motor 30e at the completion of desired upward and downward movement, respectively, of bar 36. A duplicate, independent mechanism (not shown) is provided to actuate bar 35. Although a specific actuating mechanism has been illustrated, it should be recognized that other devices, e.g., hydraulic or pneumatic cylinders, solenoids, etc., all known in the art could be used to actuate rods 31, 32 and 33, 34 without departing from the present invention.

Slidably mounted on guide rails 25 and 26 is splicing carriage 45 (FIGS. 2 and 3) having an upstanding portion 46 carrying guide wheels 47, 48 which cooperate with guide bar 24 to steady carriage 45 as it moves along rails 25, 26. Electric power is provided to carriage 45 through coiled conductor wire 49 which in turn is kept from sagging during travel of carriage 45 by guide wire 50 which extends through the center of coiled wire 49 and is connected between supports 22 and 23. Mounted on carriage 45 are material cutting means 51, adhesive material dispensing means 52, and tape cutting means 53.

Material cutting means 51 is comprised of tracing knife 55 having a sharp blade 56, e.g., commercial razor blade, carried by holder 57. Knife arm 58 is attached to holder 57 and is pivoted on carriage 45 at 59. Flange 58a is affixed to arm 58 and has an opening therein, through which rod 61 of solenoid 60 passes. Rod 61 is preferably in two parts, hinged together at 62 so that it will not bind when solenoid 60 is actuated to rotate arm 58 about pivot 59. Solenoid 60 is secured to carriage 45 by flange 63 and nut 64. Spring 65 is positioned on rod 61 between flange 58a and retainer 66 fixed on rod 61 to provide flexibility to knife arm 58. Coil spring 58b is connected between stud 58c on knife arm 58 and stud 72b on tape arm 72 to return knife arm to its original position when solenoid 60 is deactuated.

Figure 2:
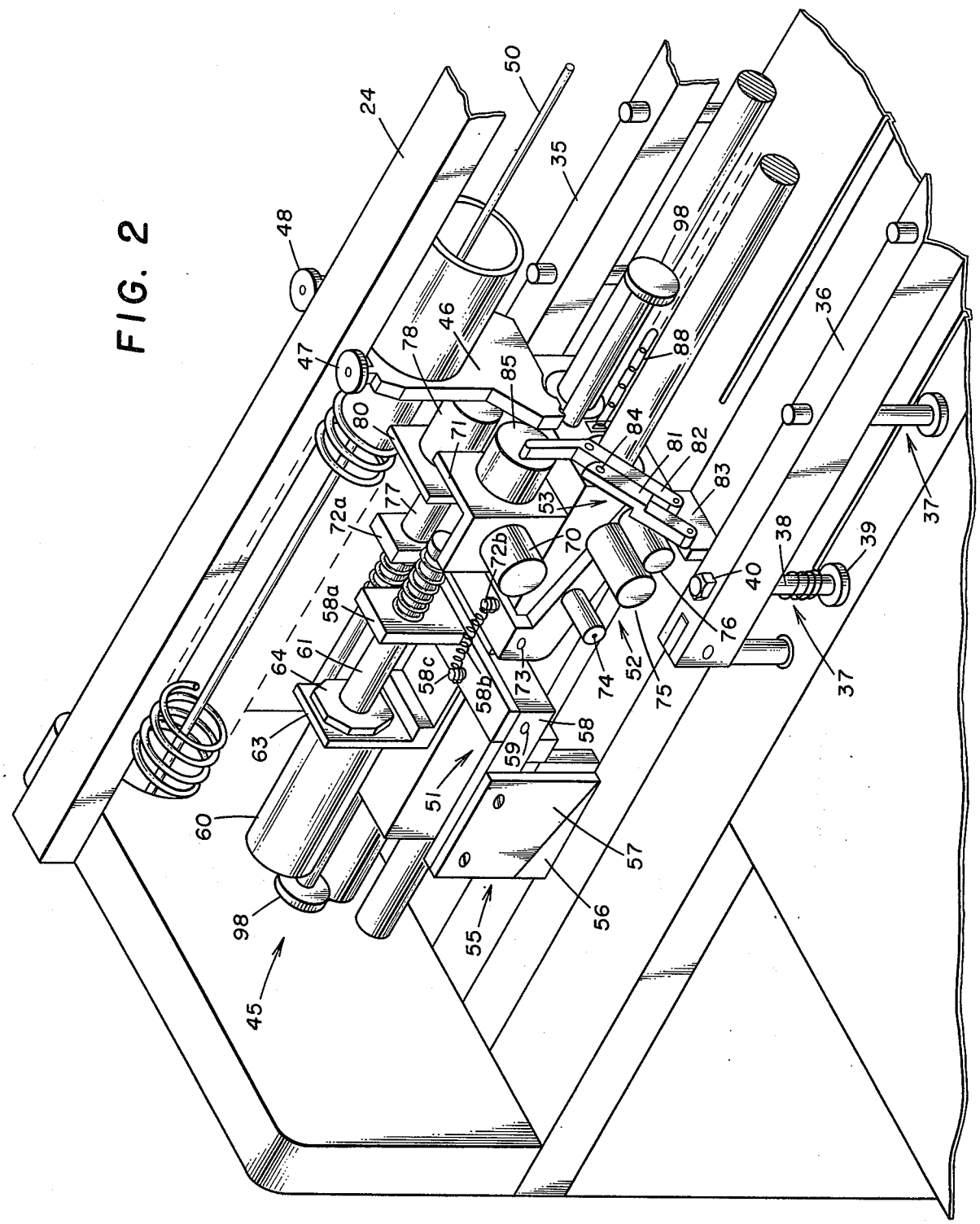
FIG. 2 is a perspective view of the splicing carriage of the present invention.

Adhesive material dispensing means 52 is comprised of a tape reel 70 which is rotatably mounted on L-shaped support 71 on carriage 45. Tape arm 72 is pivoted on carriage 45 at 73 and carries guide roller 74, idler 75, and pressure roller 76. Idler 75 is to be of nonsticking material, e.g., Teflon, and is preferably notched to reduce surface contact between sticky side of the tape and idler 75. Pressure roller 76 is preferably of hard rubber or the like so that adequate pressure may be applied to the tape during taping operation as will be explained below. Attached to arm 72 is flange 72a which has an opening therein through which rod 77 of solenoid 78 passes. Rod 77 is preferably in two parts, hinged together at 79 so that it will not bind when solenoid 78 is actuated to rotate arm 72 about pivot 73. Solenoid 78 is secured on carriage 45 by means of flange 80 (FIG. 2). Spring 80a is positioned on rod 77 between flange 80 and retainer 80b fixed on rod 77 to provide flexibility on tape arm 72. Coil spring 58b returns arm 72 to its original position when solenoid 78 is deactuated.

Tape cutting means 53 is comprised of a pair of arms 81, 82, the lower end of each is pivotally connected to tape knife 83. The upper end of arm 81 is pivotally connected to carriage 45 at 84 while the upper end of arm 83 is pivotally connected and is actuated by rotational solenoid 85 which in turn is affixed to L-shaped support 71. When solenoid 85 is actuated, it rotates arm 82 in a counterclockwise direction to cause knife 83 to move downward into contact with track 17. Arm 81 is also rotated indirectly by action of the solenoid, thereby maintaining knife 83 in a horizontal relationship with respect to track 17 so that knife 83 will cut the tape evenly and cleanly. A spring (not shown) within solenoid 85 returns tape knife 83 to original position when solenoid 85 is deactuated.

Chain 88 (FIG. 2) is attached at one end to the front edge 89 of carriage 45, and at its other end to the back edge 90 of said carriage. Chain 88 passes over idler gear 91 near support 22, over drive gear 92 of a commonly available reversible electrical drive motor (not shown) and over an idler gear (not shown) at the other end of track 17 near support 23. When drive gear 92 is driven in counterclockwise direction, chain 88 will cause carriage 45 to move toward support 23 and when gear 92 is driven in a clockwise direction, carriage 45 will move toward support 22. A limit switch, e.g., photoelectric cell 95 (FIG. 1), is positioned near either end of track 17 which senses reflective surfaces 96 (FIG. 2) on carriage 45 to automatically stop the drive motor when the carriage reaches the end of its desired travel in either direction. Safety stops 98 (FIG. 2) are also provided on either end of carriage 45 to prevent carriage 45 from slamming into supports 22, 23 in the event limit switches 95 malfunction.

Control box 100 in which is housed the logic and electrical circuitry necessary for controlling the splicing operation is mounted on support 23 for easy access by an operator standing in front of apparatus 10. The splicing operation is preferably automated, as will be described below, but manual override switches are positioned on the panel of box 100 to independently control certain features of the operation. For example, a separate switch to control motor 30e may be provided to raise and lower holddown means 30. Also, switches are provided for controlling the valving (not shown) coupling the vacuum source to individual slots 19, 20, respectively, so that, if a sheet of material is not wide enough to cover all the slots, openings 21 in those slots 19, 20 near support 23 which are not covered can be independently blocked by closing the proper valves.

Operation of apparatus 10 is as follows. An operator positions himself in front of apparatus and places a first seismic section (not shown) on work surface 11 with the line to be on the section overlying groove 18 in track 17. Lights 15 and the lights (not shown) under track 17 are turned on to assist in properly positioning said section. Vacuum is then applied to grooves 19 and 20 through openings 21 therein to pull said section down and secure same over track 17. As mentioned above, if the section is not wide enough to cover all slots 19, 20, the vacuum being applied to the uncovered slots is discontinued. A second seismic section is then positioned on work surface 11 with the majority of this section extending off toward the back of apparatus 10. The line to be cut on the second section is precisely positioned over the line to be cut on the first section. At this point, the remainder of the operation can be automated or each step can be manually actuated as preferred.

If automated, the start button on the panel of control box 100 starts motor 30e and its companion motor (not shown) to move rods 31, 32, and 33, 34 downward to bring securing members 37 on bars 29, 30, respectively, into contact with said seismic sections to positively secure same in a fixed relationship. When contact 33b actuates limit switch 33d, motor 30e is stopped (this also is true of the duplicate mechanism operating holddown means 29). Limit switch 33b also starts the carriage drive motor (not shown) to drive gear 92 to cause carriage 45 to commence travel along guide rails 25, 26 toward support 23.

Upon start of the carriage drive motor, knife solenoid 60 is actuated to move rod 61 inward to rotate arm 58 about pivot 59 to lower knife blade 56 into groove 18 of track 17. As carriage 45 moves along over track 17, blade 56 effects a neat, clean cut along the common line through both seismic sections which overlie groove 18. As reflective surface 97 passes, it is sensed by limit switch 95a, carriage drive motor and hence drive gear 92 is stopped thereby halting movement of carriage 45. Also, limit switch 95a deactuates solenoid 60 and spring 58b raises knife blade 56 upward out of contact with track 17 and back to its inactive position. At the same time, limit switch 95a actuates motor 30e to raise bar 30 so that the scrap from the second section may be removed by the operator. Limit switch 33c stops motor 30e and after a time delay, e.g., 2 seconds, starts carriage drive motor in a reversed direction to drive gear 92 in the opposite direction to cause carriage 45 to move back along track 17 toward support 22.

The adhesive material, e.g., Scotch Brand "Magic Transparent Tape" manufactured by (and "Scotch Brand" is registered as a U.S. trademark by) the 3M Company of St. Paul, Minnesota, on reel 70 is threaded over guide roller 74 and idler 75 (as shown in FIGS. 3, 4, and 4A) with the sticking side 70a of tape 70c only touching the notched surface of Teflon (a registered U.S. trademark of E. I. DuPont de Nemours and Co.) idler 75. It can be seen from FIG. 4, when adhesive material dispensing means 52 is in an inoperable position with arm 72 up with respect to carriage 45, the nonsticking side of tape 70c will normally contact the seismic sheet as carriage 45 moves toward support 23 during the cutting operation. Positioned within track 17 at the point where limit switch 95a will halt carriage movement are slots 101 (FIGS. 1, 4, and 4A). As carriage 45 comes to rest, the loose end 70b of tape 70c will fall into one of grooves 101 (FIG. 4). When movement of carriage 45 is reversed, end 70b will loosely be held by groove 101 until carriage 45 has moved sufficiently to bring the sticking side 70a of tape 70c into a position whereby it will stick to "controlled-sticking" sections of track 17 once the taping operation is commenced. Some sticking between tape 70c and track 17 must occur in order for the tape to be pulled off reel 70 as carriage 45 moves back toward support 22. However, this sticking should be light so that the tape can be easily peeled from track 17 at the end of the splicing operation.

After the time delay mentioned above, carriage 45 begins to move back toward support 22. If the material being spliced is of maximum width, as soon as carriage 45 has moved a distance necessary to allow reversal of tape 70c to its sticking side 70a, as explained above, solenoid 78 is actuated to cause rod 77 to move inward to lower arm 72 of adhesive material dispensing means 52. As pressure roller 76 contacts tape 70, it will cause the tape to stick first to track 17 (as explained above) and then to seismic sections 102 (FIGS. 4 and 4A only) to secure the now abutting sections together along the common splice line.

Preferably, a variable delay feature is included in adhesive material dispensing means 52 which can be set according to the width of the material being spliced. If sheets of material having smaller widths are to be spliced, it would be undesirable to have a long strip of excess tape on track 17 before actual taping of seismic section 102 begins. To prevent this, a delay can be set so that solenoid 78 is not actuated until a predetermined lapse of time has occurred between the time carriage drive motor is actuated and the time solenoid 78 is actuated.

As the taping operation is concluded, limit switch 95 senses reflective surface 96 on carriage 45 to stop carriage drive gear 92 and to actuate rotational solenoid 85 to lower tape knife 83 to cut tape 70. At the same time, the mechanism for holddown means 29 is actuated to lift same and the vacuum source is stopped to allow the spliced sections to be removed. This is easily done since the slight excess tape on the "nonsticking" portion of track 17 presents no problem while the excess tape on the "controlled-sticking" portion of track 17 is easily peeled therefrom.

What is claimed is:

1. An apparatus for splicing two sheets of material together in a desired relationship, said apparatus comprising:
 a work surface on which said sheets can be positioned in said desired relationship;
 a splicing assembly extending across said work surface, said assembly comprising:
 a track extending across said work surface, said track having a cutting groove therein;
 guide means extending across said work surface above said track;

means for securing said sheets on said work surface so that the common line of those portions of said sheets to be spliced overlies said cutting groove; and a carriage movably mounted on said guide means, said carriage comprising:
   means for cutting said sheets along said common line when said carriage is moved in a first direction along said guide means; and
   means for applying adhesive tape material to said sheets along said common line to secure said sheets together in said desired relationship when said carriage is moved in a second opposite direction along said guide means;
   means for moving said carriage along said guide means in said first and said seind directions.

2. The apparatus of claim 1 wherein said means for securing said sheets on said work surface includes:
   slots in said work surface extending parallel to said track, said slots adapted to be fluidly connected to a vacuum source; and
   holddown means positioned parallel to said track and being movable into and out of contact with said work surface.

3. The apparatus of claim 2 wherein said means for cutting said sheets includes:
   knife means pivotally mounted on said carriage;
   knife actuating means to move said knife means into said cutting groove on said track when said knife actuating means is actuated; and
   means to move said knife means out of said cutting groove when said knife activating means is deactuated.

4. The apparatus of claim 3 wherein said actuating means comprises:
   a solenoid.

5. The apparatus of claim 4 wherein said means for applying adhesive tape material includes:
   a tape reel rotatably mounted on said carriage;
   a tape arm pivotally mounted on said carriage, said tape arm adapted to receive tape from said tape reel;
   tape actuating means for moving said tape arm into contact with said track means so that tape can be dispensed along said cutting groove when tape actuating means is actuated; and
   means for moving said tape arm out of contact with said track when said tape actuating means is deactuated.

6. The apparatus of claim 5 wherein said tape actuating means comprises:
   a solenoid.

7. The apparatus of claim 6 including:
   tape cutting means mounted on said carriage comprising:
      tape knife movably mounted on said carriage, said knife being positioned so that when actuated said knife will cut the tape dispensed from said tape reel; and
   means to actuate said tape knife.

8. The apparatus of claim 7 including:
   switch means at either end of said track to stop movement of said carriage in either said first or second direction when said carriage has completed desired travel in said respective direction.

9. The apparatus of claim 8 including:
   notches in said track means at a point where said carriage completes movement in said first direction, said notches adapted to temporarily engage the loose end of tape from said tape reel to reverse the sides of the tape in contact with said track when carriage moves in said second direction.

10. The apparatus of claim 9 wherein at least a portion of said work surface is comprised of translucent material, and lighting means under said work surface for illuminating said translucent portion of said work surface.

* * * * *